(12) United States Patent
Giacomazzi et al.

(10) Patent No.: US 7,965,678 B2
(45) Date of Patent: Jun. 21, 2011

(54) CONTROLLING ACCESS TO A SHARED COMMUNICATION MEDIUM OF A MOBILE AD-HOC NETWORK

(75) Inventors: Paolo Giacomazzi, Milan (IT); Giuseppe Caizzone, Milan (IT)

(73) Assignee: Fondazione Silvio Tronchetti Provera, Milan (IT)

( * ) Notice: Subject to any disclaimer, the term of this patent is extended or adjusted under 35 U.S.C. 154(b) by 627 days.

(21) Appl. No.: 10/594,951

(22) PCT Filed: Apr. 2, 2004

(86) PCT No.: PCT/EP2004/050429
§ 371 (c)(1),
(2), (4) Date: Sep. 10, 2008

(87) PCT Pub. No.: WO2005/099172
PCT Pub. Date: Oct. 20, 2005

(65) Prior Publication Data
US 2009/0010268 A1 Jan. 8, 2009

(51) Int. Cl.
*H04W 4/00* (2009.01)
(52) U.S. Cl. .......................... 370/329; 709/243
(58) Field of Classification Search .................... None
See application file for complete search history.

(56) References Cited

U.S. PATENT DOCUMENTS

| | | | |
|---|---|---|---|
| 5,666,655 A * | 9/1997 | Ishikawa et al. | 455/512 |
| 2002/0150050 A1* | 10/2002 | Nathanson | 370/241 |
| 2003/0053424 A1* | 3/2003 | Krishnamurthy et al. | 370/316 |
| 2005/0088318 A1* | 4/2005 | Liu et al. | 340/902 |

OTHER PUBLICATIONS

Briesemeister, L. et al., "Overcoming Fragmentation in Mobile Ad Hoc Networks," Journal of Communications and Networks, 2(3), pp. 182-187, (Sep. 2000).
Singh, J. P. et al., "Wireless LAN Performance Under Varied Stress Conditions in Vehicular Traffic Scenarios," IEEE Vehicular Technology Conference, vol. 2, pp. 743-747, (Fall 2002).
Gerla, M., "Clustering and Routing in Large Ad Hoc Wireless Nets," Final Report 1998-99 for MICRO Project 98-044, pp. 1-4, (1999).
Lott, M. et al., "Medium Access and Radio Resource Management for Ad-Hoc Networks Based on UTRA-TDD," Proc. of Second ACM International Symposium on Mobile Ad Hoc Networks and Computing, pp. 76-86, (2001).

(Continued)

*Primary Examiner* — Chirag G Shah
*Assistant Examiner* — Otis L Thompson, Jr.
(74) *Attorney, Agent, or Firm* — Finnegan, Henderson, Farabow, Garrett & Dunner, L.L.P.

(57) ABSTRACT

A method of controlling access of mobile users of a substantially infrastructureless communications network to a shared communication medium, wherein the shared communication medium is partitioned into a plurality of individual communication channels that can be individually exploited for communications between the network users. The method includes determining the existence of at least one main direction of movement of the network users, the main direction of movement being a direction around which directions of movement of a prescribed number of network users are clustered; associating a group of communication channels within the plurality of communication channels to the at least one main direction of movement; and reserving the communication channels of the group to the network users moving substantially in the main direction of movement.

18 Claims, 6 Drawing Sheets

OTHER PUBLICATIONS

Borgonovo, F. et al., "ADHOC MAC: a New, Flexible and Reliable MAC Architecture for Ad-Hoc Networks," Proc. of IEEE WCNC, New Orleans, Louisiana, USA, pp. 965-970, (Mar. 16-20, 2003).

Caizzone, G. et al., "Impact of User Speed on the Performance of a MAC Protocol for Vehicular Ad-Hoc Networks," Proceedings of $3^{rd}$ Int. Conf., Electronics, Hardware, Wireless & Optical Communications, WSEAS, Salzburg, Austria, 5 pages, (Feb. 13-15, 2004).

Wang, K. H. et al., "Group Mobility and Partition Prediction in Wireless Ad-Hoc Networks," ICC 2002, 2002 IEEE International Conference on Communications, Conference Proceedings, vol. 1 of 5, pp. 1017-1021, (Apr. 28, 2002).

Chen, W. T. et al., "Group Mobility Management in Wireless Ad Hoc Networks," Vehicular Technology Conference, 2003, VTC 2003-Fall, 2003 IEEE $58^{th}$ Orlando, FA, pp. 2202-2205, (Oct. 6, 2003).

Gerla, M. et al., "Exploiting Mobility in Large Scale Ad Hoc Wireless Networks," IEEE Conference Proceedings 2003, pp. 34-39, (Oct. 20, 2003).

Pei, G. et al., "LANMAR: Landmark Routing for Large Scale Wireless Ad Hoc Networks with Group Mobility," IEEE Conference Proceedings 2000, pp. 11-18, (2000).

Gerla, M. et al., "Landmark Routing Protocol (LANMAR) for Large Scale Ad Hoc Networks," IETF Manet Working Group, Internet-Draft, pp. 1-21, (Nov. 17, 2002).

M. Gerla et al., "On Demand Routing in Large Ad Hoc Wireless Networks with Passive Clustering," Proceedings of IEEE Wireless Communication and Network Conference, 6 pages, Sep. 2000.

P. K. Enge et al., "Differential Operation of the Global Positioning System," IEEE Communications Magazine, vol. 26, Issue 7, pp. 48-60, Jul. 1988.

\* cited by examiner

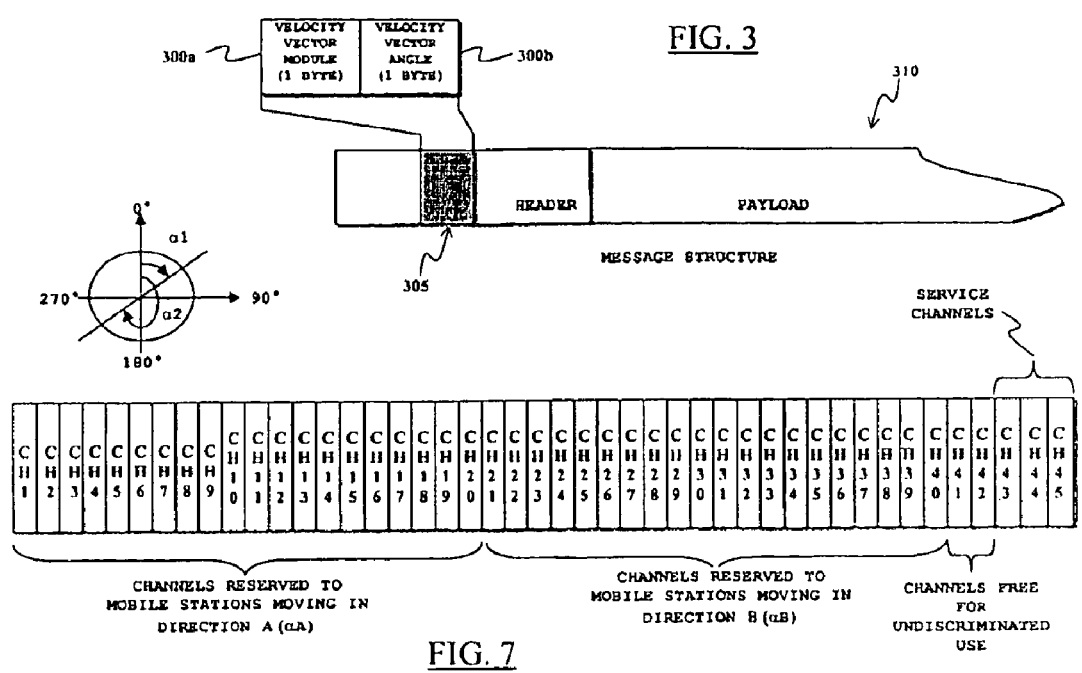

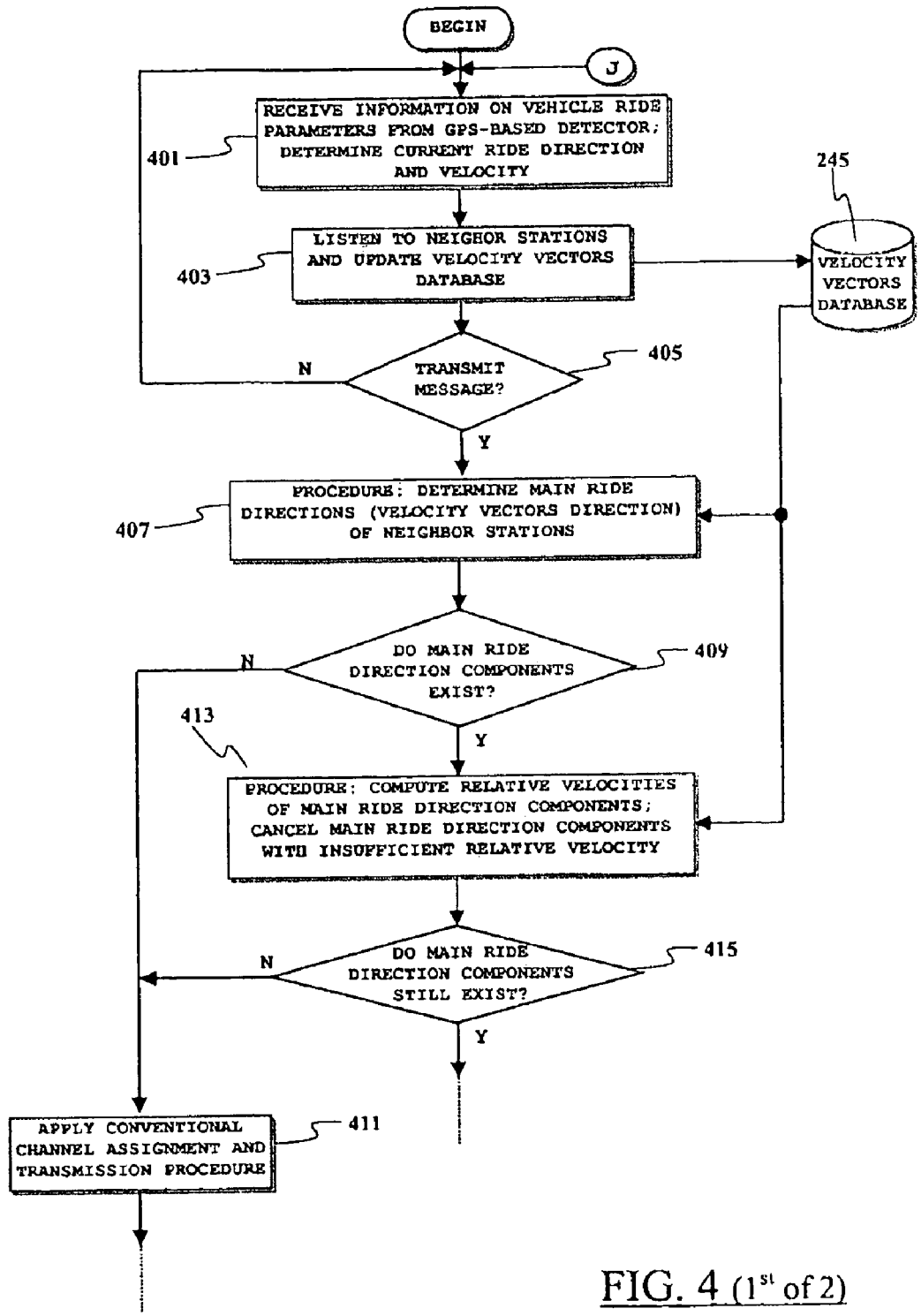
FIG. 4 (1st of 2)

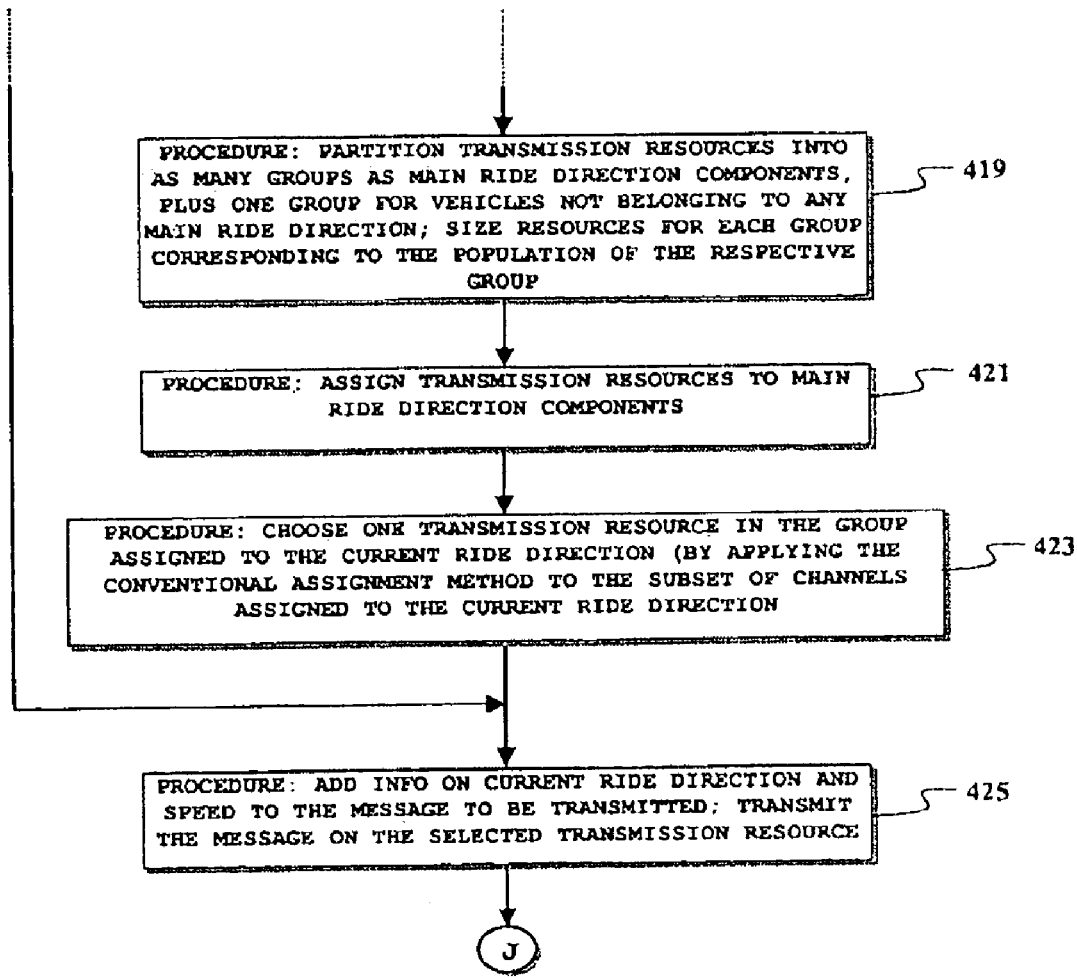
FIG. 4 (2nd of 2)

CONTROLLING ACCESS TO A SHARED COMMUNICATION MEDIUM OF A MOBILE AD-HOC NETWORK

CROSS REFERENCE TO RELATED APPLICATION

This application is a national phase application based on PCT/EP2004/050429, filed Apr. 2, 2004, the content of which is incorporated herein by reference.

BACKGROUND OF THE INVENTION

1. Field of the Invention

The present invention generally relates to the field of communications network and, particularly, to methods and systems for controlling the access to a shared communication medium. Even more particularly, the invention relates to communication media access control methods and systems for ad-hoc communication networks.

2. Description of the Related Art

Ad-hoc communication networks are a type of mobile, wireless communication networks that, differently from cellular networks, do not need (at least in principle) any fixed and wired communication network infrastructure (e.g. terrestrial base stations) for routing the communication traffic. For this reason, while cellular networks can be defined as infrastructured mobile wireless communication networks, ad-hoc networks can conversely be referred to as infrastructureless mobile wireless communication networks.

Such a goal is achieved thanks to the fact that in an ad-hoc network the network nodes are formed by mobile hosts, which are capable of movement and act as network routers, cooperating to the routing of the communication traffic. In particular, the ad-hoc network nodes communicate with each other either directly, if they are within the respective communication ranges, or, if they are not within the direct communication range, indirectly, in a multi-hop fashion, relying on one or more intermediate nodes for the outing of the communication traffic.

Consequently, in an ad-hoc network each node not only is a communication network user (or station), but it may also act as a communication traffic router and cooperates with other nodes for maintaining the network connectivity. Ad-hoc networks are thus dynamically formed by the very network users (or stations).

Ad-hoc networks are particularly useful in applications wherein a network infrastructure does not exist and setting it up is not feasible, for example for time constraints, or not convenient, for example in view of the costs to be sustained. Situations in which it may be useful to rely on an ad-hoc network for enabling communications include battlefields, areas hit by natural disasters, rescue missions, conferences, meetings, and, last but not least, inter-vehicle communications.

Despite the advantages that ad-hoc networks exhibit compared to infrastructured networks, there still are problems to be faced and solved before this type of network starts to be widely deployed. Needless to say, most of these problems are inherent to the very nature of ad-hoc networks, i.e. the mobility of the network nodes.

In the art, most of the problems of ad-hoc networks have already been recognized.

For example, in K. H. Wang et al., "Group Mobility and Partition Prediction in Wireless Ad-Hoc Networks", Proceedings of IEEE International Conference on Communications (ICC), 2002, the problem is dealt with of service disruptions due to network partitioning, that is, the separation of an ad-hoc network into completely disconnected portions, as a consequence of the mobility of the network nodes. The authors of that paper propose a velocity-based group model that characterizes the movements of the mobility groups, in order to predict network partitioning; the nodes' velocities are obtained via GPS (Global Positioning System).

As another example, in L. Briesemeister et al., "Overcoming Fragmentation in Mobile Ad Hoc Networks", Journal of Communications and Networks, 2(3):182-187, September 2000, an approach is presented for a location-based multicast of emergency messages among hosts in ad-hoc networks, like vehicles in road traffic, according to which a multicast group is defined implicitly by time, location (determined exploiting GPS vehicle navigation systems), speed and driving direction.

In J. P. Singh et al., "Wireless LAN Performance Under Varied Stress (Conditions in Vehicular Traffic Scenarios", IEEE Vehicular Technology Conference, Fall 2002, vol. 2, pp. 743-747, Vancouver, the performance of a 802.11b-based Wireless LAN (WLAN) for inter-vehicle communications in different vehicular mobility, peer-distance and driving environment conditions have been assessed, and it has been observed that the performance degrade with increasingly hostile communication scenarios; in particular, in that paper it is pointed out that the urban driving conditions are the most severe environment, while the sub-urban environment is the most favorable, and the freeway environment lies between the above two.

The Applicant has observed that in ad-hoc networks the problems of collisions between different users, that arise in situations where a shared communication medium is exploited, and the communication medium (typically a radio communication medium) is partitioned into a plurality of distinct portions (hereinafter referred to as transmission resources or communication channels) are exacerbated.

Several different ways exist of partitioning a shared communication medium into a plurality of distinct communication channels. One known way is referred to as Time Division Multiple Access (TDMA) and allows several users sharing a same frequency by dividing it into different time slots. TDMA is for example used in the General System for Mobile communications (GSM) digital cellular standard, among others. Another known way of partitioning a shared communication medium is referred to as Code Division Multiple Access (CDMA), and uses spread spectrum techniques by multiple transmitters to send messages to a same receiver on a same frequency channel at a same time without harmful interference. Still another known technique, frequently used in combination with any of the previous two techniques, is called Frequency Division Multiple Access (FDMA): in this case, each transmitter is assigned a distinct frequency channel, so that different receivers can discriminate among them by tuning onto the desired channel.

According to the Open Systems Interconnect (OSI) "layer stack" model set forth by the International Organization for Standardization (ISO), access by a network node to the shared communication medium is governed by the Media Access Control (MAC), which is the lower sub-layer of the data link layer, the interface between a logical link control and a physical layer. In addition to controlling the access to the shared communication medium, the MAC sub-layer is also concerned with breaking data up into data frames, transmitting the frames sequentially, processing the acknowledgment frames sent back by the receiver, handling address recognition.

The specific implementation of the MAC sub-layer depends, among other things, on the technique used for partitioning the shared communication medium into channels: thus, TDMA, CDMA and FDMA MAC sub-layers exist.

Generally, in a communication network a collision between two (or more) users is said to take place when the two users, both needing to transmit, access the shared communication medium exploiting a same transmission resource, i.e. a same communication channel; for example, in the case of a TDMA partitioning, a collision between two users takes place if the two users exploit the same time slot. In this situation, the physical layer of a listening user detects the presence of transmission over that communication channel (e.g., in that time slot), but the MAC layer cannot receive correctly a data block.

In an ad-hoc network, the problem of collisions is particularly felt, due to the very fact that the network architecture evolves dynamically; the relative movement of the various network nodes causes a more or less continuous change of scenario, thereby nodes that were previously within the respective communication ranges exit therefrom, and new nodes enter thereinto.

The Applicant has observed that the problems discussed above tends to be exacerbated as the relative velocity of the nodes increases, and that a particularly critical situation is encountered in ad-hoc networks for inter-vehicle communications in highway/motorway contexts: in these cases, two (more generally, a discrete, limited number of) flows of vehicles exist, corresponding to the two opposite ride directions; while the relative velocity of vehicles riding in the same direction is, on average, relatively low, the relative velocity between vehicles that ride in the two opposite directions is, on average, rather high. As a consequence, a generic vehicle riding in one of the two opposite directions crosses with a relatively high frequency vehicles riding in the opposite direction. This high frequency of crossings between vehicles riding in opposite directions makes communication collisions relatively highly probable: each crossing is in fact potentially dangerous (from the viewpoint of the communications network service quality), because the two vehicles, seen as nodes of the ad-hoc communication network, may exploit the same communication channel; if this happens, a service interruption is experienced by at least one of the two nodes.

In M. Gerla, "Clustering and Routing in Large Ad Hoc Wireless Nets", Final Report 1998-99 for MICRO project 98-044, that can be found at www.ucop.edu/research/micro/98_99/98_044.pdf, and in M. Gerla et al, "On Demand Routing in Large Ad Hoc Wireless Networks with Passive Clustering", Proceedings of IEEE Wireless Communication and Network Conference, September 2000, hierarchical clustering schemes for ad-hoc networks are dealt with.

SUMMARY OF THE INVENTION

In view of the state of the art outlined in the foregoing, it is an object of the present invention to face and solve the above-discussed problems that may seriously limit the quality of service of ad-hoc networks, and thus slow down or be of disincentive to the deployment thereof.

In very general terms, the Applicant has found that the problem of the high rate of collisions between nodes in an ad-hoc network is greatly reduced provided that an access scheme to the network's shared communication medium is adopted that provides for selectively assigning groups of communication channels according to the ride directions of the vehicles, particularly according to main vehicle ride directions, when such main ride directions exist and can be determined.

According to an aspect of the present invention, there is provided a method of controlling access to a shared communication medium.

In brief, the method comprises:

determining the existence of at least one main direction of movement of the network users, said main direction of movement being a direction around which directions of movement of a number of network users are clustered;

associating a group of communication channels within said plurality of communication channels to the at least one main direction of movement; and reserving the communication channels of said group to the network users moving substantially in said main direction of movement.

In particular, the method comprises grouping the communication channels into a number of groups depending on a plurality of main directions of movement, and reserving different groups of channels to respective main directions of movement.

Each channel group may comprise a number of channels that depends on a number of network users having directions of movement clustered around the respective main direction of movement.

In an embodiment of the invention, each network user communicates to the other network users information concerning the respective direction of movement. Said information may comprise information on a network user's velocity vector.

Said information on the network user's velocity vector may be obtained exploiting a geolocation detector, particularly a GPS-based detector.

In an embodiment of the invention, each network user calculates a distribution of movement directions of at least the neighboring network users, and determines the at least one main direction of movement by analyzing such a distribution.

The analysis of the distribution includes determining peaks in the distribution, determining the number of network users having direction of movement clustered around each peak, and validating a peak as a main direction of movement provided that the respective number of network users exceeds a prescribed value.

The method may further comprises:

calculating average velocity vectors for each main direction of movement by averaging the velocities of network users having direction of movement clustered around that direction of movement;

calculating relative average velocities between the average velocity vectors;

validating each main direction of movement provided that the relative average velocity thereof to the other average velocity vectors is not lower than a prescribed lower limit.

In an embodiment of the invention, said reserving the communication channels of said group to the network users moving substantially in said main direction of movement comprises assigning the channels of the group to the different network users substantially on a random basis.

In an embodiment of the invention, a group of channels of said plurality of channels is reserved to network users not having a direction of movement clustered around the at least one main direction of movement.

According to another aspect of the present invention, a MAC layer is provided for controlling the access to a shared communication medium by communication network users.

Summarizing, the MAC layer grants access to the shared communication medium by:

determining the existence of at least one main direction of movement of the network users, said main direction of movement being a direction around which directions of movement of a prescribed number of network users are clustered;

associating a group of communication channels within said plurality of communication channels to the at least one main direction of movement;

assigning to the network user one communication channels of said group in case the network user's direction of movement is clustered around the at least one main direction of movement.

In an embodiment of the invention, the MAC layer may communicate to the MAC layers of the other network users information concerning the direction of movement the network user.

In particular, the MAC layer includes information on a network user's velocity vector in at least one message transmitted by the network user. Said information may be derived from a geolocation detector, particularly a GPS-based detector.

In an embodiment of the invention, the MAC layer calculates a distribution of movement directions of at least the neighboring network users, and determines the at least one main direction of movement by analyzing such a distribution.

In particular, peaks in the distribution are determined, the number of network users having direction of movement clustered around each peak is determined, and a peak is validated as a main direction of movement provided that the respective number of network users exceeds a prescribed value.

In an embodiment of the present invention, average velocity vectors for each main direction of movement are calculated by averaging the velocities of network users having direction of movement clustered around that direction of movement; relative average velocities between the average velocity vectors are calculated; and each main direction of movement is validated provided that the relative average velocity thereof to the other average velocity vectors is not lower than a prescribed lower limit.

In an embodiment of the invention, said one communication channel of the group is assigned to the network user substantially on a random basis.

In an embodiment of the invention, the network user is assigned a communication channel not belonging to said group in case the network user's direction of movement is not clustered around the at least one main direction of movement.

Other aspects of the invention relate to a transmitter for a network user, and a communications network.

BRIEF DESCRIPTION OF THE DRAWINGS

These and other features and advantages of the present invention will be made apparent by the following detailed description of an embodiment thereof, provided merely by way of non-limitative example, description that will be conducted making reference to the attached drawings, wherein:

FIG. 3 schematically shows a possible structure of messages exchanged by the mobile stations of the ad-hoc network, in an embodiment of the present invention;

FIG. 4 is a simplified flowchart schematically showing a shared communication medium accessing method according to an embodiment of the present invention;

FIG. 7 pictorially shows an exemplary partition into distinct communication channels of the shared communication medium, and an exemplary assignment of channels to main vehicle ride directions, according to an embodiment of the present invention.

DETAILED DESCRIPTION OF THE INVENTION

Figure 1:
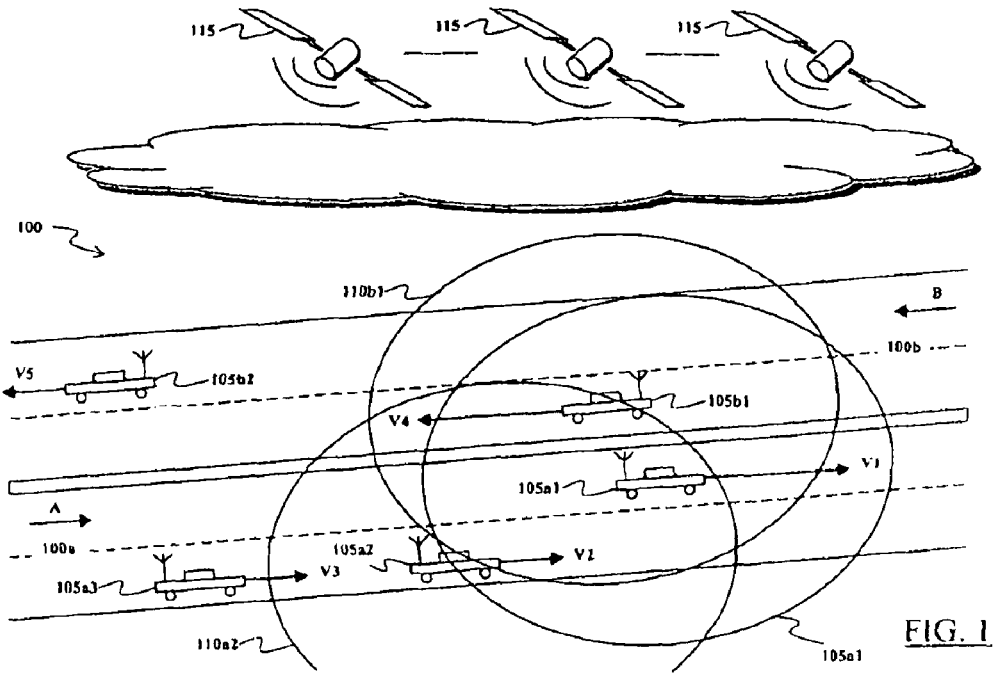
FIG. 1 shows quite schematically an inter-vehicle ad-hoc communication network scenario wherein a shared communication medium access method according to an embodiment of the present invention is advantageously applied.

With reference to the drawings, in FIG. 1 there is shown quite schematically an exemplary ad-hoc communication network scenario wherein a shared communication medium access control method according to an embodiment of the present invention can be advantageously applied.

In greater detail, the exemplary scenario herein considered is that of an ad-hoc communication network intended for inter-vehicle communications, particularly in the context of a highway or motorway or freeway 100, more generally any context wherein the vehicles mainly ride along a discrete and limited number (let it be said, roughly, not more than ten) of well-defined main ride directions; in the simple case herein considered, it is assumed that the vehicles ride in two main ride directions, respectively identified by arrows A and B in the drawing, corresponding to exemplary east-bound and west-bound lane pairs 100*a*, 100*h* of the highway.

Vehicles 105*a*1, 105*a*2, 105*a*3, riding the highway 100 in the direction A, and vehicles 105*b*1 and 105*b*2, riding the highway 100 in the direction B, with respective velocity vectors V1, V2, V3, V4 and V5, are assumed to have on-board suitable communication equipment (not shown in FIG. 1 for the sake of clarity of the drawing), adapted to enable inter-vehicle communication in the infrastructureless (or substantially infrastructureless) context of the ad-hoc communication network. Thus, each vehicle (more precisely, the respective communication equipment) does not merely act as a user of the communication network, transmitting and receiving traffic explicitly directed thereto, but plays an active role in setting up the communication network and maintaining the network connectivity; specifically, each vehicle acts as a mobile network node or station, and cooperates with the other mobile network stations to routing the communication traffic. For this reason, in the following reference will also be made to the vehicles 105*a*1, 105*a*2, 105*a*3, 105*b*1 and 105*b*2 as the mobile stations of the ad-hoc network or, concisely, the mobile network stations.

The ad-hoc communication network is a radio network, and each mobile network station has a communication coverage range which is relatively limited in space; direct radio communication between two generic mobile network stations is only possible if the two stations are within the respective communication coverage ranges. From a practical viewpoint, the communication coverage range may widely vary, depending on the specific technology adopted for physical transmission; for example, in a UTRA-TDD ad-hoc network (an acronym that stands for UMTS Terrestrial Radio Access—Time Division Duplexing; the UTRA is the terrestrial implementation of the Universal Mobile Telecommunication System—UMTS) the coverage range may have a radius of the order of some hundred meters, for example 500 m.

In FIG. 1, three roughly circular areas 110a1, 110a2 and 110b1 are intended to represent the communication coverage areas of the mobile network stations 105a1, 105a2 and 105b1, respectively; in the snapshot depicted in FIG. 1 the network stations 105a1 and 105b1 are within the respective communication coverage ranges 110a1 and 110b1, and can thus communicate directly with each other; the network station 105a2 is depicted in the act of entering the two communication coverage areas 110a1 and 105b1; the remaining two network stations 105a3 and 105b2 are within the respective communication coverage ranges (not shown for the drawing's clarity sake), but are outside the communication coverage ranges of the stations 105a1 and 105b1. Network stations which are not within the respective communication coverage ranges can notwithstanding this communicate with each other in a multi-hop manner, with the help of other, intermediate stations which act as communication traffic routers; for example, the network station 105b2 can communicate directly with the station 105 at, which in turn can communicate directly with the station 105a2, thus any one of the two stations 105a1 or 105b1 can communicate, albeit indirectly, with the station 105b2.

Also schematically shown in FIG. 1 is a satellite-based geolocation system, such as the Global Positioning System (GPS), which is a system per-se well known (and for this reason not described herein in detail) comprising a constellation of satellites 115 orbiting around the Earth and each one broadcasting Radio-Frequency (RF) signals containing a predetermined carrier frequency, and a frequency-modulated signal carrying encoded data, typically including data such as the orbital position of the satellite, the time of the day, and other information.

In the exemplary and non-limitative embodiment of the invention herein considered, it is assumed that the vehicles 105a1, 105a2, 105a3, 105b1 and 105b2 acting as mobile network stations are also equipped with apparatuses adapted to determine vehicle ride parameters, particularly the vehicle ride direction and, preferably, the vehicle velocity vector V1, V2, V3, V4 and V5 (in a predefined, common reference system, or in different reference systems having a well-known relationship), in both direction and absolute value. Expediently, in an embodiment of the present invention such apparatuses exploit the GPS and, in particular, include per-se known on-board GPS navigation equipments. It is however pointed out that this is not to be construed as a limitation of the present invention, since any apparatus capable of determining the vehicle ride direction and, preferably, the vehicle velocity vector may be employed, other than GPS-based apparatuses.

Figure 2:
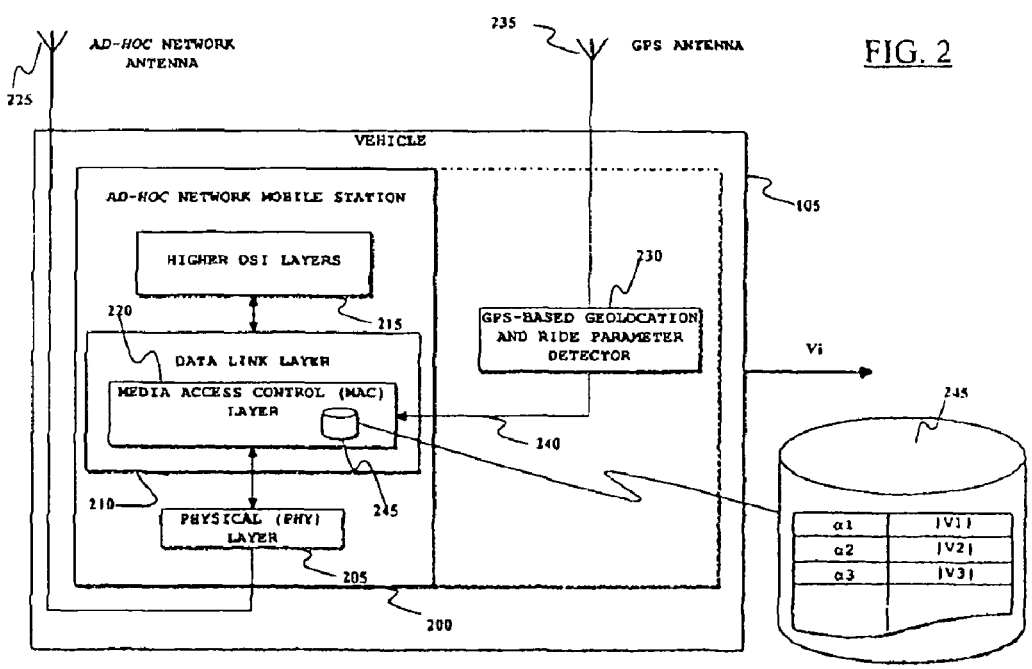
FIG. 2 schematically shows, in terms of functional blocks, a generic mobile station (i.e., a node) of the ad-hoc communication network of FIG. 1, adapted to implement the above-mentioned shared communication medium access method.

Referring now to FIG. 2, there is shown a schematic, functional block diagram of the main components (or, at least, the components relevant to the purposes of the present description) of a generic one 200 of the mobile ad-hoc network stations, on-board of a generic one 105 of the vehicles 105a1, 105a2, 105a3, 105b1 and 105b2.

The mobile network station 200 is structured according to the ISO's OSI layered model architecture, and includes a plurality of layers, comprising in particular a physical layer 205, a data link layer 210, and higher layers of the OSI model, not shown in detail but as a single box, and globally indicated as 215.

The data link layer 210 includes in particular a Media Access Control (MAC) sub-layer 220 (in the following simply referred to as the MAC 220). The MAC 220 has several functions, including breaking data up into data frames, transmitting the frames sequentially, processing the acknowledgment frames sent back by the receiver, handling address recognition, but the main function of the MAC 220, and the one which is important for the purposes of the present description, is one of controlling the access of the mobile ad-hoc network station 200 to the ad-hoc network shared communication medium for transmission purposes. Thus, the MAC 220 implements a communication medium access protocol that is used by the different network stations for sharing the shared communication medium exploited by the ad-hoc network.

For the purposes of the present description, the term shared communication medium is to be construed rather broadly, meaning any medium that may be used for enabling intercommunication between different communication network devices (such as the mobile network stations 200, but possibly also fixed or base stations—not shown in the drawings—provided in case the network is not totally infrastructureless), and that is shared between the different communication devices; an example of shared communication medium is a specified radio frequency or frequency range that is to be exploited for radio communications between the nodes of the ad-hoc network.

In order to enable multiple mobile network stations access the shared communication medium, the latter is subdivided into distinct communication medium portions, or transmission resources, herein generally referred to as communication channels, which in principle are of the most disparate nature. For example, the communication channels may take the form of different time slots within a base time unit, such as the forty-five time slots CH1 to CH45 per frame provided for in the UTRA-TDD (schematically shown in FIG. 7, which will be described in detail later on); alternatively, the channels may be represented by spread-spectra signals obtained by applying different codes (a technique typical of CDMA), or different frequencies within a prescribed frequency range.

The MAC 220 may interact with the physical layer 205 via a Media Independent Interface (MII) thereof, not shown in the drawing, which enables the interaction between the MAC 220 and units of the physical layer 205 responsible of managing the low-level ("physical") details of the communication over the shared communication medium, particularly a transmitting section and a receiving section. The physical layer 205 is coupled to an ad-hoc network antenna 225, particularly an RF antenna, which can be either directional (a sector antenna) or omnidirectional, used for communicating with other users of the ad-hoc network.

Block 230 in FIG. 2 schematically identifies, as a non-limitative example of computation of speed and direction, a GPS-based geolocation and ride parameter detector apparatus installed on-board of the vehicle 105 and adapted to determine the vehicle ride parameters, particularly the velocity vector V1 of the vehicle 105, i.e. the vehicle velocity absolute value and orientation in the predefined reference coordinate system. In particular, the GPS-based geolocation and ride parameters detector 230 is coupled to a GPS antenna 235, through which the GPS-based geolocation and ride parameter detector 230 receives the RF signals broadcasted by the satellites 115 of the GPS.

The GPS-based geolocation and ride parameter detector 230 provides to the MAC 220 information (identified as 240 in FIG. 2) concerning the velocity vector Vi of the vehicle 105.

A full description of the GPS technology can be found in various prior-art references, and goes beyond the purposes of the present description.

Without entering into excessive details, per-se well known, the GPS-based geolocation and ride parameters detector 230 can establish the vehicle ride parameters by the information obtained from multiple satellites 115 of the GPS system; in particular, one way to derive the vehicle velocity vector calls for exploiting the vehicle geolocation information, i.e. the information about the vehicle position, derived from the information on the orbital position of a plurality (e.g., three or more) of GPS satellites, received along with the frequency-modulated signals broadcasted by such satellites; an alternative way to derive the vehicle velocity vector exploits a shift in the carrier frequency received from a plurality of GPS satellites (again, three satellites, for example) due to the Doppler effect caused by the vehicle movement. Alternatively, the Differential GPS (DGPS) technique may be adopted. With DGPS, stationary GPS receivers are present in the territory and vehicles can correct their geolocation computations connecting to stationary receivers, for example via GSM, obtaining correction parameters in order to make computation more precise. A description of the differential operation of GPS can be found in P. K. Enge et al., "Differential Operation of the Global Positioning System", IEEE Communications Magazine, Vol. 26, Issue 7, pages 48-60, July 1988. It is however pointed out that the specific methodology by means of which the vehicle ride parameters, particularly the vehicle velocity vector, are calculated is not limitative to the present invention.

It is observed that as the GPS-based geolocation and ride parameter detector 230, apparatuses already present in the equipments of the vehicle 105 for, e.g., navigation purposes can be exploited (GPS navigation systems are more and more commonly installed on the vehicles of new production); alternatively, the GPS-based geolocation and ride parameters detector 230 may be part of the apparatuses making up the mobile network station 200.

It is pointed out that at least some parts of the mobile network station 200 and of the GPS-based detector 230 may be and, normally, are implemented as a mix of hardware and software, or even totally as software. In particular, the MAC 220 may include or rely upon a suitably-programmed data processing system, such as a microprocessor of suitable computational power.

The information 240 concerning the velocity vector Vi of the vehicle 105 is exploited by the MAC 220 of the mobile network station 200 for controlling the access to the shared communication medium. In particular, referring to FIG. 3, and according to an exemplary embodiment of the present invention, each mobile network station communicates to the other mobile network stations the respective velocity vector Vi, in terms of both absolute value and direction (orientation) in the predefined reference coordinate system. FIG. 3 shows quite schematically the structure of a generic message transmitted by a generic mobile network station. The MAC 220 of that mobile network station receives a pre-compiled message from the higher OSI layers 215 and, before passing the message to the physical layer 205 for physically transmitting the message, the MAC 220 puts into the message to be transmitted the information 240 concerning the vehicle velocity vector received from the GPS-based device 230. For example, two bytes 300a and 300b in a header portion 305 of a message 310 to be transmitted may be used, one byte 300a being used for communicating the velocity vector absolute value (module) and the other byte 300b for communicating the velocity vector direction (orientation or angle). In particular, the byte 300a is adapted to encoding $2^8=256$ different velocity values, e.g. from 0 to 255 Km/h, with a resolution of 1 Km/h, while the byte 300b is adapted to encoding $2^8=256$ different angle values, from 0° to 360° sessagesimal (0 rad to $2\pi$ rad, in radians), with a resolution of 1.4° (0.024 rad). It is pointed out that in case such a relative high resolution is not required for the velocity vector absolute value and/or the velocity vector orientation, less than two bytes may be used (for example, one byte nibble—four bits—may be used for communicating the velocity vector absolute value, and the other nibble may be used for communicating the angle); on the contrary, should a higher resolution be required, more than two bytes could be exploited.

Exploiting the information broadcasted by the neighboring mobile network stations (i.e., the mobile network stations which are within the communication coverage range of a network station under consideration), each mobile network station, by simply listening the other stations, knows the velocity vector (in terms of absolute value and direction) of every neighboring mobile network station. To this purpose, the MAC 220 of the generic mobile network station, upon receiving a message from the generic neighboring mobile network station, before passing the received message to the higher OSI layers 215 extracts from the header 305 of the received message 310 the two bytes 300a, 300b, and updates a local database 245, wherein the pairs of vehicle velocity angle and absolute value $(\alpha 1,|V1|), (\alpha 2,|V2|), (\alpha 3,|V3|)\ldots$ received from the different neighboring stations are stored; in this same database 245, the velocity angle and absolute value own pair of that mobile network station may be stored (alternatively, this pair of values may be stored in a different database or memory location). As will be better described later on, based on this data the MAC 220 is capable of determining a distribution of vehicle ride directions, and, particularly, of determining the existence of main vehicle ride directions.

Reference is now made to the schematic and simplified flowchart of FIG. 4, depicting the operation of the MAC 220 of the generic mobile network station 200 on-board of the generic vehicle 105, particularly a MAC-implemented procedure of communication channel assignment, according to an exemplary and non-limitative embodiment of the present invention.

The MAC 220 periodically receives from the GPS-based geolocation and ride parameters detector 230 the information 240 on the vehicle ride parameters, particularly the vehicle velocity vector Vi; based on this information, the MAC 220 determines the current vehicle ride direction and velocity absolute value, in the predefined reference coordinate system (block 401). This information is stored by the MAC 220, for example in the local database 245.

The MAC 220 also constantly listens to the neighboring stations, receiving messages transmitted by them. The MAC 220 extracts from the messages received from the neighboring stations the information on the respective velocity vectors (for example, contained in the bytes 300a and 300b in the message header) and updates the local database 245 (block 403), storing the pairs of velocity vector absolute value and orientation of the different neighboring stations. In particular, it is observed that the database 245 can be completely updated every predefined time interval, corresponding for example to the base time made up by the time slots constituting the different communication channels.

After these operations (and, possibly, other operations, not relevant to the present description), the MAC 220 messages received from the neighboring stations are passed to the higher OSI layers 215.

As long as the higher OSI layers 215 do not request the MAC 220 to transmit messages, the MAC 220 simply repeats the above described actions (exit branch N of decision block 405); for example, this occurs as long as a transmit message queue is checked as empty.

When instead the MAC 220 detects that there is a message to be transmitted (exit branch Y of decision block 405), for example because one or more messages are waiting in the message queue, the MAC 220 has to control the access of the respective station 200 to the shared communication medium, and in particular the MAC 220 has to choose a communication channel among the available channels into which the shared communication medium is partitioned. To this purpose, a communication channel assignment procedure is entered, which will be now described.

As a first step, the MAC 220, on the basis of the information stored in the database 245, determines whether main ride direction components (i.e., main directions of movement) exist for the neighboring network stations. To this purpose, the MAC 220 firstly extracts from the local database 245 the stored velocity vector angle values α1, α2, α3, . . . , and determines an angular distribution of the velocity vectors of the neighboring network stations; subsequently, on the basis of the angular distribution thus obtained, the MAC 220 determines the main fide direction components of the neighboring stations (block 407).

Figure 5:
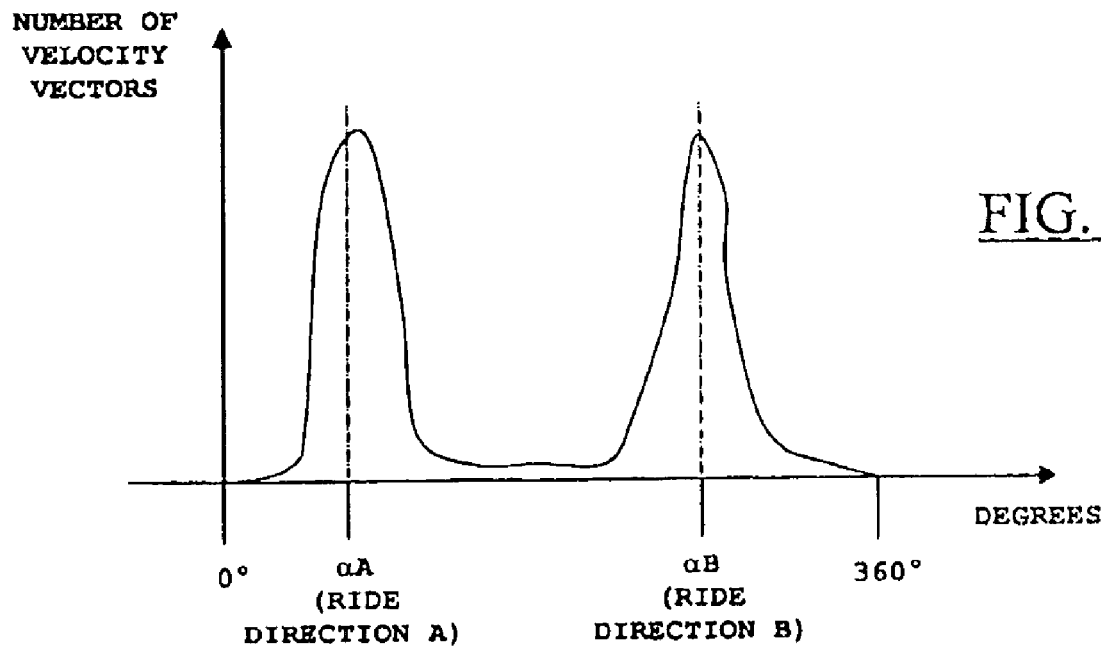
FIG. 5 is an exemplary distribution of vehicle velocity vectors by vehicle ride directions (angles), as observed by a generic vehicle in the scenario of FIG. 1.

The diagram of FIG. 5 shows an exemplary (and schematic) angular distribution of neighboring vehicle velocity vectors as observed by a generic vehicle in the scenario of FIG. 1, for example the vehicle 105a2: it can be appreciated that the angular distribution of the neighboring vehicle velocity vectors exhibits two peaks, about a first and a second angles αA and αB, respectively; the first angle αA corresponds to the ride direction A, in the predefined reference coordinate system, for example 45°, while the second angle αB, differing from the first angle αA of approximately 180° (αB=225° in the example herein considered), corresponds to the ride direction B, opposite to the ride direction A. The velocity vectors angular distribution depicted in FIG. 5 thus refers to a situation in which substantially all the vehicles move in either one of two main ride directions, which in the example herein considered correspond to the directions A and B of the highway 100. It is observed that while in the diagram of FIG. 5 the two peaks are almost equal in height (meaning that the number of vehicles riding in direction A is substantially equal to the number of vehicles riding in the direction B), this is merely accidental and clearly not a limitation for the present invention: one peak could be higher, even significantly, than the other. Additionally, it is remarked that the scenario of FIG. 1 is merely exemplary: in a different scenario, in which more than two main ride directions exist (for example, four main ride directions, such as in correspondence of highway crossings), the number of peaks in the neighboring velocity vectors distribution will be higher. It is observed that situations may occur wherein the number of main ride directions is lower than two, and only one main ride direction can be identified: this is for example the case of the scenario depicted in FIG. 1, but wherein one of the two ride directions, e.g. direction B, experiences a traffic jam, whereby the vehicles riding in that direction move very slowly.

For better clarity, and just by way of example, let it be assumed that the network station herein considered has twenty neighboring stations, whose velocity vectors have the following angular directions (in the predefined reference coordinate system, the angles being expressed in radians—from 0 to 2π—for facilitating the mathematics):

| Neighboring station | Velocity vector angle (rad) |
| --- | --- |
| 0 | 0.78 |
| 1 | 0.7 |
| 2 | 0.69 |
| 3 | 0.9 |
| 4 | 0.84 |
| 5 | 0.82 |
| 6 | 0.81 |
| 7 | 0.85 |
| 8 | 0.86 |
| 9 | 0.87 |
| 10 | 3.92 |
| 11 | 3.93 |
| 12 | 3.97 |
| 13 | 3.96 |
| 14 | 3.82 |
| 15 | 3.83 |
| 16 | 3.77 |
| 17 | 3.65 |
| 18 | 3.72 |
| 19 | 3.7 |

This exemplary distribution will be considered hereinafter to better clarify general statements.

From a mathematical viewpoint, the angular distribution of the velocity vectors is described by the following function:

$$f(\alpha) = \frac{1}{D} \sum_{i=0}^{D-1} \delta(\alpha - \alpha_j).$$

where D is the number of neighboring stations (20 in the example herein considered), δ(α) is the Dirac's delta function, and $\alpha_i$ is the velocity vector direction of the $i^{th}$ neighboring station. The function $f(\alpha)$ is the probability density of velocity vectors as a function of the vehicles ride directions.

Figure 6A:
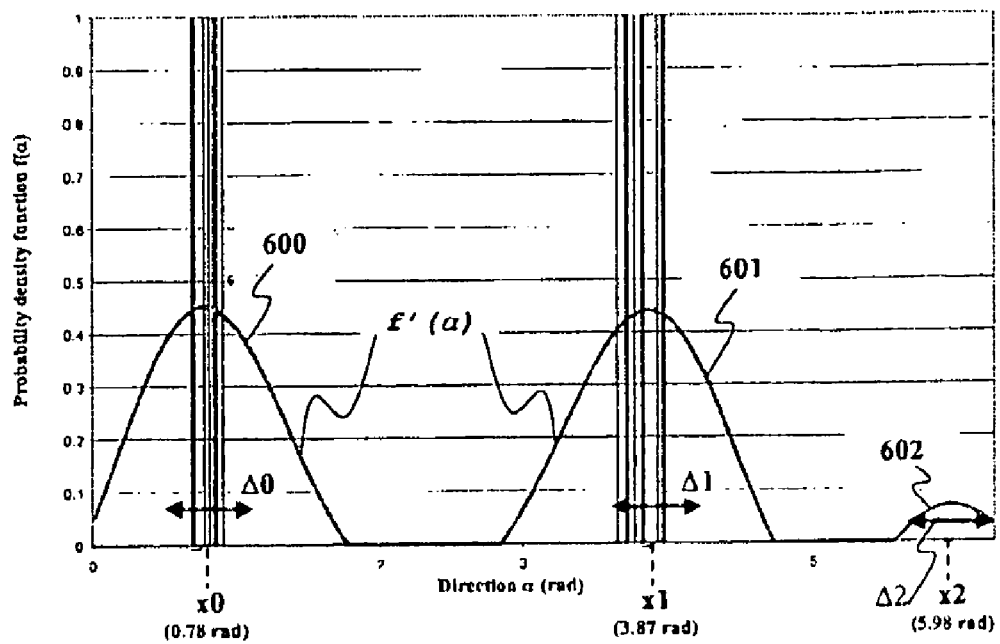
FIG. 6A is a diagram of an exemplary probability density function of vehicle velocity vectors as a function of the vehicle ride directions in a scenario like that depicted in FIG. 1, before and after a low-pass filtering process.

FIG. 6A is a diagram showing the probability density function $f(\alpha)$ in the exemplary case reported in the above table, which relates to a scenario similar to that depicted in FIG. 1 (in the diagram of FIG. 6A, each impulse has an area equal to 1/20=0.05). It can be appreciated that the velocity vectors directions are gathered around two directions, close to roughly 1 rad and 4 rad, respectively.

Once the distribution of the velocity vector directions (i.e., the angular distribution) has been established, the MAC 220 analyzes the obtained distribution in order to determine whether main directions of movement (main ride directions) can be identified for the neighboring vehicles; in particular, this procedure step allows the MAC establishing if the context is one of a highway. In greater detail, the purpose of this step is that of deriving, from the angular distribution of the neighboring stations' velocity vectors, main direction components, with a sufficient degree of approximation. To this end, several techniques may be adopted, more or less complicated from a mathematical viewpoint and, consequently, more or less precise in terms of the results achieved. For example, a relatively simple technique calls for submitting the probability density distribution to an ideal low-pass filtering process; once this technique is applied to the exemplary distribution depicted in FIG. 6A, the resulting distribution denoted in the drawing by f'(α) is obtained.

It is observed that the ideal low pass filter applied in the example has amplitude equal to 1 for frequencies in the range [−0.6, 0.6] and amplitude equal to 0 for all other frequencies. It is pointed out that the ideal low-pass filtering applied in the example herein considered can be parameterized with a different cutoff frequency. The higher the cutoff frequency, the tighter the peaks around the main direction components. It is easily understood that an infinite number of parameterizations of the ideal low-pass filter are possible. The filter must be designed in order to obtain a satisfactory selectivity, that is, the capability of separating different main direction components. Moreover, the filter should not be excessively selective, for example, it should not assign vehicles running in almost parallel directions to different main direction components. The choice of the filter cutoff frequency determines the tradeoff between a high and a low selectivity. For example, by choosing a cutoff frequency equal to 0.6, it has been chosen, in the example considered, to be capable of discriminating vehicle directions among a set of approximately $0.6 \cdot 2\pi = 4$ possible main direction components. This is because, in the example, the maximum output frequency of the low-pass filter is equal to 0.6, therefore, at most four maxima are present in the function $f'(\alpha)$ between 0 and $2\pi$. In general, the Applicant has determined that the cutoff frequency of the low pass filter can be designed once the maximum number of main direction components, M, has been fixed, according to the formula $2\pi f_c \sim M$. The designer, according to the desired number of direction components among which vehicles must be sorted, has the possibility of assigning properly the filter cutoff frequency. Therefore, the particular cutoff frequency chosen in the example reported in FIG. 6A is just a non-limitative example. Other values of the cutoff frequency of the low-pass filter may be applied. Furthermore, the adoption of an ideal low-pass filter is only an example. Other filters, with a smoother transition around the cutoff frequency may be as well envisaged.

The main direction components can then be derived by analyzing the peaks in the (low-pass filtered) distribution $f'(\alpha)$: in the shown example, two peaks are identified, and thus two main ride directions, at 0.78 rad and 3.87 rad, respectively (the third, lower peak, located at 5.98 red, is actually a spurious by-product of the low-pass filtering process). All the vehicles having velocity vectors whose directions are close to the direction corresponding to one of the peaks identified are declared to be riding in that main ride direction.

Figure 6B:
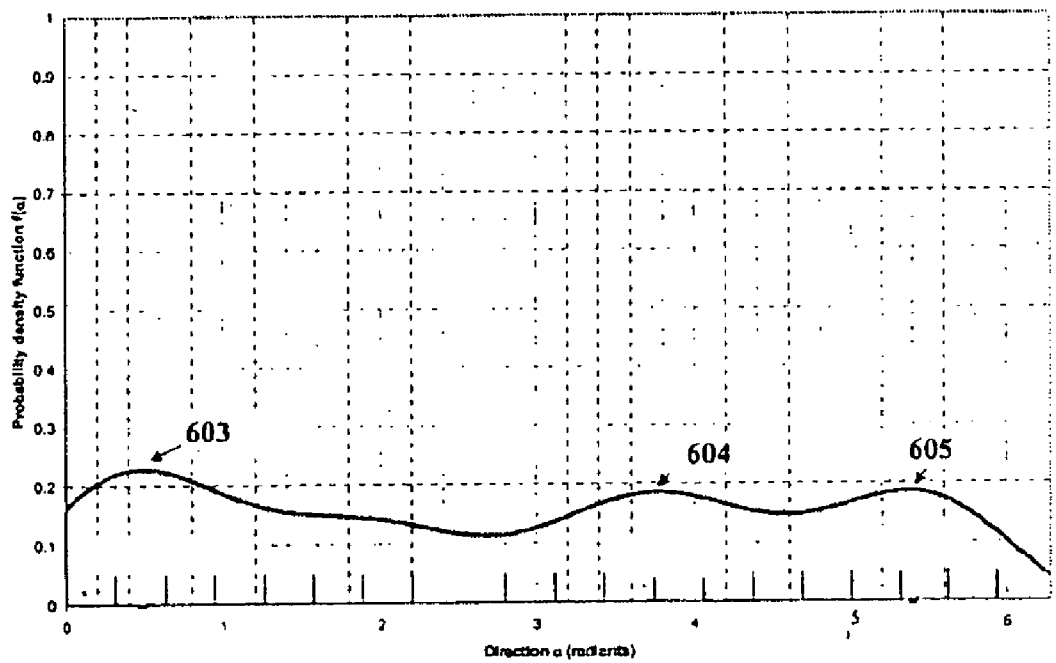
FIG. 6B is a diagram showing, by way of comparison to FIG. 6A, an exemplary, low-pass filtered probability density function of vehicle velocity vectors as a function of the vehicle ride directions in a quasi-isotropic ride directions scenario.

By way of comparison, the diagram provided in FIG. 6B shows an exemplary, low-pass filtered probability density function of vehicle velocity vectors as a function of the vehicle ride directions in a quasi-isotropic ride directions scenario; it can be appreciated that no well-defined main ride directions can in this case be identified.

Several procedures to detect the main ride direction components can be envisaged. A possible, exemplary procedure is outlined hereinbelow (the description makes reference to FIG. 6A).

In a first phase (phase 1) the relative maxima of the function $f'(\alpha)$ are localized. In the example of FIG. 6A, the three detected maxima are labeled 600, 601, and 602, respectively. During the process of localization of the relative maxima of the function $f'(\alpha)$, the abscissas of the relative maxima are also computed. In the example, the abscissas of the maxima 600, 601, and 602 are labeled as x0, x1, and x2, respectively, as shown in FIG. 6A. The result of this computation, in the example, gives x0=0.78 rad, x1=3.87 rad, and x2=5.98 rad.

In a second phase (phase 2), for the $i^{th}$ detected relative maximum, with abscissa xi (x0, x1 and x2), the respective angular range $\Delta i = [xi - \Delta, xi + \Delta]$ is considered, wherein the symbol $\Delta$ appearing in the equation is a parameter fixed with a procedure that will be explained in the following. All velocity direction samples falling in the angular range $\Delta i$ are assigned to the $i^{th}$ main direction component.

A wide set of choices is available for selecting the parameter $\Delta$. If $\Delta$ is small, only a small number of direction samples will be included in the main direction component. If $\Delta$ is large, a higher number of directions is included in the main direction components, but these ride directions will not be almost parallel to each other, rather they will be spread over a relatively wide angular sector. The choice of the parameter $\Delta$ can be carried out according to a heuristic procedure. In this example, $\Delta$ is chosen equal to 0.25 rad (approximately 15°). Therefore, in the example, the three angular ranges are $\Delta 0 = [0.53, 1.03]$, $\Delta 1 = [3.62, 4.12]$, $\Delta 2 = [5.73, 6.23]$. The three angular ranges are shown in FIG. 6A.

In a third phase (phase 3), for each value of i, vehicles within the angular range $\Delta i$ are assigned to the main ride direction i.

In a fourth phase (phase 4), all vehicles with ride directions not included in any one of the above-determined angular ranges, are not assigned to any main ride direction.

Referring to the example herein considered, the result of this four procedure phases is that ten vehicles out of the overall twenty are assigned to the main direction component "0" (0.78 rad), ten vehicles are assigned to the main direction component "1" (3.87 rad), and 0 vehicles are assigned to the (spurious) main direction component "3" (5.98 rad).

Back again to FIG. 4, the MAC 220 then checks if main ride directions components exist (decision block 409), that is, if main ride directions have actually been identified by the above procedure, executed in block 407.

This control is for example performed in the way outlined hereinbelow.

Firstly, the number N1 of vehicles not assigned to any main direction component is computed. Moreover, the number N2=D−N1 of vehicles assigned to main direction components is computed. In the example herein considered, N1=0 and N2=20.

Then, the fraction $\eta$ of vehicles not assigned to any main direction component is computed, according to the following formula: $\eta = N1/D$.

If the fraction $\eta$ is below a maximum threshold fraction value $\eta max$, then the main direction components and the associated assignment of vehicles computed in phase 4 of the above described procedure is considered valid; if instead the fraction $\eta$ is greater than $\eta max$, then the MAC declares that no main direction components are present. The choice of the maximum threshold $\eta max$ depends on the selected parameterization of the system. In this example, the maximum threshold $\eta max$ is fixed to 0.2 (that is, at most 20% of vehicles can move along directions different from the main direction components). In the example, $\eta = 0/20 = 0 < \eta max$, therefore, the two main direction components detected in phase 4 are valid.

The reason why this check is performed is that, if the distribution of ride directions is almost isotropic (as in the example of FIG. 6B), the filtered probability distribution of the ride directions may nevertheless have peaks (in the exemplary distribution of FIG. 6B, albeit the distribution is rather smooth, the three peaks identified as 603, 604 and 605 can be identified). In this case, it would not be correct to assume that main direction components are present. Therefore, the control performed at decision block 409 prevents the MAC 220 from incorrectly deciding that, in case of a nearly isotropic fide direction distribution, main direction components are present.

If main ride direction components have not been detected (exit branch N of decision block 409), the MAC 220 judges as not justified the actuation of the peculiar, selective communication channel assignment procedure according to the embodiment of the present invention herein described, thereby any conventional channel assignment rule is adopted (block 411), providing for assigning channels in a substantially random, distributed way.

An example of how channels are conventionally assigned to the network stations in a distributed way is for example described in M. Lott et al., "Medium Access and Radio Resource Management for Ad-hoc Networks based on UTRA-TDD", Proc. of Second ACM International Symposium on Mobile Ad Hoc Networks and Computing, 2001; in particular, that paper provides a proposal of channel assignment procedure in the case of a customized UTRA-TDD physical layer. The channel assignment procedures proposed in the referred paper have been upgraded in F. Borgonovo et al., "ADHOC MAC: a New, Flexible and Reliable MAC Architecture for Ad-hoc Networks", Proc. of IEEE WCNC, New Orleans, La., USA, Mar. 16-20, 2003.

Further modifications to the referred channel assignment procedure are proposed in G. Caizzone, P. Giacomazzi, L. Musumeci, G. Verticale, "Impact of User Speed on the Performance of a MAC Protocol for Vehicular Ad-Hoc Networks", Proceedings of $3^{rd}$ Int. Conf., Electronics, Hardware, Wireless & Optical Communications, 13-15 Feb. 2004, WSEAS Salzburg (Austria).

Without entering into details, not relevant to the description of the present invention embodiment, a possible channel assignment procedure actuated when no main ride direction components are identified may be the following.

In order to avoid collisions between different network stations, each MAC includes in the header of the transmitted messages information about the status of the channels, as the stations can recognize by listening to the time slots; in particular, such information take the form of bitmaps included in the header of the transmitted messages. One bitmap, including one bit for each time slot, describes the idle/busy status of the time slots, as perceived by the station transmitting the bitmap. This bitmap can be called the "physical bitmap". Each neighbor of a network station under consideration (the reference station) can learn which time slots are perceived as idle or busy by the reference station by reading the "physical bitmap" transmitted by the reference station. The reference station may also classify time slots as collided or not collided. Therefore, an additional, "collision bitmap" may be added by the MAC to the transmitted message. If the reference station classifies one time slot as "collided", it will set the corresponding bit in the collision bitmap to the proper value. In this way, all the neighbor stations of the reference station can learn which time slots are considered collided and not collided by the reference station.

A network station wishing to access the communications network for transmitting data must firstly synchronize to the MAC frame and multiframe. Once synchronized, the network station must observe a complete multiframe, examine the physical and collision bitmaps of all neighbors and detect busy, idle, and collided time slots. In the next multiframe, the network station can try the channel acquisition procedure. If the procedure is successful, the accessing network station enters the transmission status, otherwise, the network station tries again the acquisition. Acquisition may rail if a time threshold is exceeded or if a maximum number of trials is exceeded.

During the channel acquisition procedure, if the accessing station recognizes that no time slots are available (i.e. all the channels are busy or collided) it does not try to access the network and keeps on monitoring the status of time slots in the subsequent multiframes. Additionally, a network station does not access the network also in the case that at least one time slot in the multiframe is in the collided state. As soon as the station observes a multiframe with no collided slots and with at least one available slot, the station randomly chooses one of the available time slots and starts the acquisition procedure. Assuming that the station chooses to acquire the (available) time slot i, the station transmits a reservation packet on time slot i in the next multiframe and starts to examine the bitmaps transmitted by its neighbors. The reservation is successful if all neighbors report the transmission as successful, that is, the time slot i is signaled as busy, and not collided, by all neighbors. If the reservation is successful, the station enters the transmission state. If the reservation is unsuccessful, the station repeats the access procedure until either a channel is acquired or the acquisition is aborted.

Back to FIG. 4, if instead main ride direction components have effectively been detected (exit branch Y of decision block 409), the MAC 220 performs another check, this time based on the absolute values of the velocities of the neighboring stations. In fact, the adoption of the peculiar, direction-based selective channel assignment method according to this embodiment of the present invention is useful provided that the relative velocity of the vehicles riding in the main ride directions is sufficiently high: in a situation in which, albeit a discrete, limited number of main ride directions exist, the relative vehicle velocities are very low, such as in a condition of traffic jam (the vehicles are almost steady in queue), it may be preferable to adopt the conventional channel assignment method.

In particular (as schematized by block 413), the MAC 220 calculates the average relative velocities of the vehicles riding in the main ride directions. To this purpose, indicated as M the number of the distinct main ride direction components previously identified (M=2 in the example considered above), the number $m_i$ of vehicles whose velocity vectors have directions corresponding to the $i^{th}$ main ride direction component is for example calculated by counting the number of samples (i.e., the number of vehicles) subtended by the respective $i^{th}$ peak in the probability density function $f'(\alpha)$; for example, referring to FIG. 6A, the number of samples subtended by the peak 600 about 0.78 rad is equal to ton, and so is the number of samples subtended by the peak 601 about 3.87 rad; it is observed that the small, spurious peak 602 at 5.98 rad that appears in FIG. 6A, caused by queues in the impulse response of the low-pass filter adopted to filter the probability density distribution, does not subtend any sample (the number of samples subtended by this peak is zero). Thus, in the example considered herein, $m_1 = m_2 = 10$, $m_3 = 0$.

The average velocity of vehicles riding in each one of the main ride directions is for example calculated by the MAC 220 averaging the declared velocity absolute values of each vehicle (the values |V1|, |V2|, |V3| . . . taken from the database 245) riding in that ride direction (or substantially in that ride direction, i.e. falling within the above-determined angular range).

Generally speaking, the velocity vector of the $j^{th}$ vehicle assigned to the $i^{th}$ main ride direction component is indicated as $\vec{v}_{i,j}$, and the absolute value thereof, or module, is indicated as $|\vec{v}_{i,j}|$.

Moreover, from the analysis of the low-pass filtered velocity distribution, $f'(\alpha)$, the main ride directions have been already identified. Formally, the direction of the $i^{th}$ main component is referred to as $\vec{\alpha}_i$, with the respective absolute value being $|\vec{\alpha}_i|=1$.

The average velocity, $v_{ave,i}$, of the $i^{th}$ ride direction component can be calculated as:

$$v_{ave,i} = \frac{1}{m_i}\sum_{j=1}^{m_i} \vec{v}_{i,j} \cdot \vec{\alpha}_i,$$

where $\vec{v}_{i,j}\cdot\vec{\alpha}_j$ identifies the scalar product of $\vec{v}_{i,j}$ and $\vec{\alpha}_i$.

A number M of average velocity vectors is thus obtained, one for each main ride direction component, and each one having direction equal to the respective main ride direction, and absolute value equal to the average of the absolute values of the velocity vectors of the vehicles that are riding in that main ride direction. For example, the average velocity vector associated with the $i^{th}$ direction, referred to as $\vec{v}_{ave,i}$, has module equal to $v_{ave,i}$, and direction equal to that of the unity vector $\vec{\alpha}_i$.

Once the M average velocity vectors are obtained, the relative average velocities can be calculated by performing a suitable number of differences of these vectors.

After having calculated the relative average velocities, the MAC 220 checks whether these average velocity values are too low for justifying the adoption of the peculiar channel assignment method according to this embodiment of the present invention.

In particular, for each main direction component i (with $0\leq i\leq M$) the relative average velocity $v_{ave,i,j}$ (with $0\leq j\leq M$, $j\neq i$) with respect to all other main direction components is computed by the modules of the difference between the average velocity vector for the main direction i and the average velocity vector for the other main directions, that is, $v_{ave,i,j}=|\vec{v}_{ave,i}-\vec{v}_{ave,j}|$.

If at least one of the values $v_{ave,i,j}$ thus obtained is greater than a prescribed velocity threshold value, $v_{min}$, then the main direction component i is validated. Otherwise, if none of the relative velocities $v_{ave,i,j}$ is greater than $v_{min}$, the main direction component i is not validated and it is cancelled from the set of the main direction components. All vehicles previously assigned to the main direction component i are inserted in the pool of vehicles not assigned to any main ride direction component.

This procedure is repeated for all main direction components previously detected.

The MAC 220 then checks again if, after this operation, main direction components still exist (decision block 415). Similarly to the check performed in block 409, the number N1 of vehicles not assigned to any main direction component is computed (such a number may have changed as a result of the procedure just described); the fraction η (η=N1/D) of vehicles not assigned to any main direction component is re-calculated. If the fraction η is below a maximum threshold (e.g., maximum threshold ηmax), then the main direction components and the associated assignment of vehicles, computed in phase 4 of the procedure implemented by block 407, possibly changed as a result of the procedure implemented by block 409 due to insufficient relative average speed, is considered valid; if instead the fraction η is greater than the above maximum threshold (e.g., greater than ηmax), then the MAC 220 declares that no main direction components are present.

The reason why the check in block 415 is performed is that if main direction components do exist, but the relative average speed it too small, then the application of the selective channel assignment method according to the invention embodiment here described is not particularly advantageous, and the conventional channel assignment procedure should be applied.

If the MAC 220 ascertains that no more main direction components exist (exit branch N of decision block 415), then the conventional channel assignment method is adopted (block 411).

On the contrary, if the MAC 220 ascertains that main direction components still exist (exit branch Y of decision block 415), then the selective channel assignment method according to this embodiment of the present invention is adopted.

In this latter case, the MAC 220 implements a selective communication channel assignment that takes into account the existence of main ride directions of the vehicles and, preferably (but this is not strictly necessary), also takes into account the number of vehicles that ride in each of these directions. In particular, the MAC 220 partitions the number of available channels (available transmission resources) into a number of channel groups equal to the number of main ride directions identified in the previous steps; preferably, each channel group includes a number of channels that depends on and, particularly, is directly proportional to, the population of the respective main ride direction, i.e. the number of neighboring mobile network stations that moves in the different main ride directions (block 419).

In greater detail, referring for example to FIG. 7, there is schematically shown a set of communication channels of a shared communication medium. In detail, three UTRA-TDD frames are grouped into one so-called MAC multiframe, therefore, forty-five communications channels CH1 to CH45 are available, which take the form of different time slots per base time unit (the time occupied by one multi-frame). Conventionally, the three upper channels CH43, CH44 and CH45 are service channels, reserved for the exchange between the network stations of service information such as synchronization data and the like; the remaining forty-two channels CH1 to CH42 are available for the communication traffic exchange between the different network stations; these channels will be hereinafter referred to as the available channels.

It is observed that this channel structure is typical for example of the UTRA-TDD system, applied to vehicular ad-hoc networks, similarly to the proposal described in the already cited paper by M. Lott et al., "Medium Access and Radio Resource Management for Ad-hoc Networks based on UTRA-TDD", where UTRA-TDD frames are grouped into MAC layer multi-frames.

According to an exemplary embodiment of the present invention, a prescribed, possibly limited number of the available channels CH1 to CH42 is left free for arbitrary assignment to the network stations, such as the two channels CH41 and CH42 in FIG. 7, while the remaining available channels CH1 to CH40 are selectively assigned to the distinct vehicle main ride direction components.

In this exemplary and non-limitative case, as discussed in the foregoing, the MAC 220 which needs to transmit a message, after having determined the main ride directions, firstly partitions the set of forty channels CH1 to CH40 (forty-two available channels, less the two channels CH41 and CH42 left free for arbitrary assignment) into two or more sets of channels, on the basis of the number of main ride directions that have been determined; each of these subsets includes a number of channels directly proportional to the number of vehicles riding in one of the previously identified (two) main ride direction components, as defined by the following formula:

$$C_i = \frac{m_i(C - C^*)}{\sum_{j=0}^{M} m_j}$$

with $0 \leq i \leq M$, where Ci (with $1 \leq i \leq M$) denotes the number of channels belonging to the $i^{th}$ channel subset (associated with the $i^{th}$ main ride direction component), $C_0$ denotes the number of channels not assigned to any main direction component, $m_i$ (with $1 \leq i \leq M$) denotes (as in the foregoing) the population of the $i^{th}$ main ride direction component, i.e. the number of vehicles riding in the $i^{th}$ main ride direction, $m_0$ denotes the number of vehicles not assigned to any main direction component, C is the number of available channels and C˙ is the number of channels left free for arbitrary assignment (respectively, forty-two and two, in the example of FIG. 7), and M is (as before) the number of main ride direction components. In the example considered herein, M=2, C−C˙=40, $m_0$=0, $m_1$=$m_2$=10, thereby $C_1$=$C_2$=20.

It is observed that different types of channel number partitioning can be adopted; for example, nothing prevents from partitioning the available channels by simply dividing the number (C−C˙) of available channels by the number M of different main rife directions, i.e. without adopting a criterion of proportionality with the population of the main ride directions.

Once the number of channels to be reserved to each main ride direction component and to vehicles not assigned to any main ride direction component has been established, the MAC 220 has to determine which of the available channels are to be reserved to different main ride directions (block 421).

To this purpose, according to a non-limitative embodiment of the present invention, a fixed, predetermined assignment scheme is adopted according to which there is provided a mapping of the main ride direction components (considered in absolute terms, with respect to the predefined reference system of coordinate) and the set of channels. This means that if the M main ride direction components identified by the MAC 220 correspond to the angles 0 rad<αA rad<αB rad<αC rad< . . . <αM rad<2π rad, the first $C_1$ channels are considered reserved to the main ride direction αA, the subsequent $C_2$ channels are considered reserved to the main ride direction αB, and so on, up to the $C_M$ available channels which are considered reserved to the main ride direction αM; the last $C_0$ channels are not assigned to any main direction component. Referring to the example considered herein, the first twenty channels CH1 to CH20 are thus reserved to the main ride direction αA, and the following twenty channels CH21 to CH40 are considered reserved to the other main ride direction αB; the remaining two channels CH41 and CH42 are instead assigned to those network stations which, due to their velocity vector, have not been assigned to any one of the main direction components, In addition, these remaining channels can be left free for arbitrary communications, for example between vehicles belonging to the opposite main ride directions. This channel assignment scheme is schematized in FIG. 7.

It is worth noting that if vehicles in one direction move very slowly, due to a traffic jam, and vehicles in the other direction move at relatively high velocities, only one main direction component is recognized, however, according to the described procedure, the totality of transmission channels is divided into one subset for the stationary vehicles, one subset for moving vehicles, and one subset for arbitrary communications.

It is observed that several different channel assignment schemes can be envisaged, the one which has just been described being merely exemplary (albeit that scheme has the advantage of being rather straightforward). For example, an alternative channel assignment scheme may provide for a flexible correspondence between the main ride direction components and the channels (not based on a mapping between absolute angle values and channel groups).

Once the MAC 220 has established the correspondence between the main ride directions and the available channels, the MAC 220 has to choose one of the available communication channels for transmitting the message waiting to be sent. To this purpose, the MAC 220 first determines the main ride direction along which the respective vehicle is riding, for example direction A in FIG. 1 (this is done on the basis of the information 240 received from the GPS detector 230, for example by comparing the velocity vector angle with the main ride directions); then, once the MAC 220 has determined the group of communication channels to be used for transmitting the message, it has to determine the particular communication channel to actually use for transmitting the message; that is, the MAC 220 has to choose for transmission one of the channels that have been considered reserved to that main ride direction (block 423); in the example of FIG. 7, these are the channels from CH1 to CH20. This operation may be carried simply by performing the conventional transmission procedure described above, applied to the subset of channels reserved to the current main ride direction component (in the example, the channels from CH1 to CH20. Thus, the MAC 220 applies the conventional assignment method to the selected subset of channels from CH1 to CH20, instead of applying the conventional assignment method to the entire set of channels from CH1 to CH40 as it would be the case if no main ride directions were detected or validated.

It is observed that in this step, two problems may arise.

A first problem is that stations in the neighborhood of the station under consideration (the reference station) may partition transmission resources in a different way. In the previous example, the reference station may assign channels from CH1 to CH20 to the main ride direction component at 0.78 rad and channels from CH21 to CH40 to the main ride direction component at 3.87 rad. If no coordination among stations is performed, a neighbor of the reference station may assign the channels from CH1 to CH20 to the main ride direction component 3.87 rad and the channels from CH21 to CH40 to main ride direction component 0.78 rad. This would disrupt the system performance, as collisions among stations riding in opposite direction would be take place. Several solutions to this first problem are possible.

One possible solution to this problem is the following. Stations simply sort main ride direction components in increasing direction (measured in radians) order. Then, lower-index channels can be assigned to lower-rad directions. According to this solution, all vehicles in the neighborhood would assign channels from CH1 to CR20 to main ride direction component 3.87 rad and channels from CH21 to CH40 to main ride direction component 0.78 rad. This solution does not require any additional communication among stations.

A second problem that may arise is that each neighboring station may detect a slightly different number of vehicles in each main ride direction component. Therefore, the channels groups determined by each station in the neighborhood of the reference station may be slightly different. For example, the reference station may assign to the first main ride direction component channels from CH1 to CH20, and to the second main ride direction component channels from CH21 to CH40.

A neighbor of the reference station may assign to the first main ride direction component channels from CH1 to CH21, while channels from CH22 to CH40 are assigned to the second main ride direction component. This is not a serious problem as channels within the same group are allocated according to the conventional channel assignment procedure. The conventional channel assignment procedure assumes that already occupied channels cannot be acquired by accessing stations. Therefore, even if the neighbor station uses channel CH21 to communicate within the group of vehicles moving along the first main ride direction component and the reference station, moving along the second main ride direction component, wants to acquire a channel, the reference station would hot acquire channel CH21 because, according to the conventional channel assignment procedure, channel CH21 would be sensed as busy. Therefore, no conflicts can occur even if a misalignment of channel groups among neighboring stations occurs.

Once the MAC 220 has chosen the channel to be used for transmitting the message, the MAC 220 adds to the message received from the higher OSI layers 215 the information concerning the vehicle ride parameters (velocity vector angle and absolute value), and then the MAC causes the message to be transmitted by the physical layer 205.

The information on the vehicle ride parameters that are added to the message will allow the MACs 220 of the neighboring network stations, receiving the message, to know the ride direction and velocity of the transmitting vehicle.

After having transmitted the message, the MAC operation flow jumps back to block 401 (connector J).

The Applicant conducted simulations to verify whether the channel assignment method according to the described embodiment of the present invention achieved the expected increase of performance. In particular, the simulations have been conducted assuming to use a UTRA-TDD physical layer, operated in the frequency band from 2010 MHz to 2020 MHz, with a chip rate of 3.84 Mchip/s. The cited physical layer provides for frames 10 ms long, each frame containing 15 time slots of 667 μs. No code division has been adopted, thereby the spreading factor is equal to 1. For error detection, a code with a rate of ½ is adopted.

The propagation environment has been assumed to be ideal, meaning that all network users have an equal transmission coverage range R, assumed equal to 500 m. Also, the communication has been assumed to be error-free.

The MAC 220 of the simulations organizes the frames in multiframes, each multiframe being made up of three frames, whereby each multiframe lasts 30 ms and includes 45 time slots; similarly to the example shown in FIG. 7, three time slots per multiframe are service time slots reserved for the exchange of control signals, not for payload (these three time slots are positioned each one at the beginning of a respective UTRA-TDD frame of the multiframe; in FIG. 7 the three service time slots have been assumed to be at the end of the multiframe just for simplicity)

The mobile network stations are equipped with a MAC according to the present invention, capable of dynamically allocating the communication channels to the different stations, in a distributed manner The simulations carried out have assumed a situation like that depicted in FIG. 1, that is a highway scenario with two main directions of ride of the vehicles. In particular, a highway section has been considered, and it has been assumed that the vehicles travel throughout the highway section in either one of the two directions, at an average velocity of 75 Km/h. The relative average velocity of the two vehicle flows is thus 150 Km/h.

Figure 8:
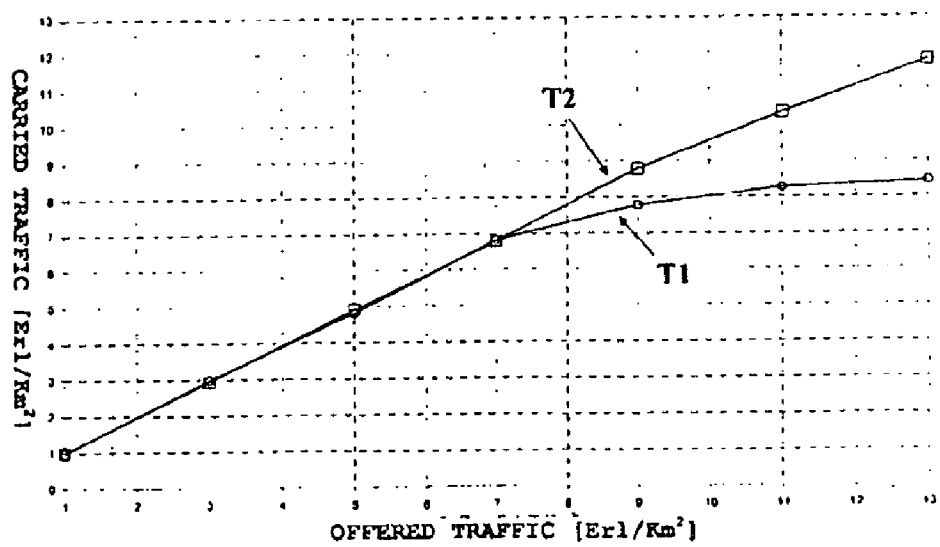
FIG. 8 is a diagram showing a comparison between the communication traffic carried by the ad-hoc network when the method according to the herein described embodiment of the present invention is adopted, compared to a conventional channel assignment method.

The results of the simulations are reported in FIG. 8. The offered traffic (in abscissa) is measured in Erlang per square kilometer ($Erl/km^2$), and is defined as the average number of active users, for unit area, in an ideal system capable of satisfying all the service requests. The carried traffic (in ordinate), measured again in $Erl/km^2$, is defined as the average number of active users, per unit area, in the actual system, taking into account the service request refused for resource shortage.

In particular, the curve T1 in FIG. 8 shows the carried traffic as a function of the offered traffic in a conventional channel assignment method, while the curve T2 shows the carried traffic as a function of the offered traffic when the channel assignment method according to the present invention is used.

From the diagram, it can be appreciated that when the traffic level is relatively low, there are no substantial differences between the conventional channel assignment method and the method according to the present invention; in fact, if the vehicle density is low, the resources are abundant. On the contrary, when the offered traffic exceeds a certain threshold value (which varies depending on the specific context), the channel assignment method according to the present invention allows increasing the network performance. In particular, it can be observed that the carried traffic maintains substantially the same direct proportionality with the offered traffic with the increase of the latter, while the conventional method causes a saturation for offered traffic values higher than 7 $Erl/Km^2$. It is important to note that, if the offered traffic is relatively high, for example, 13 $Erlang/km^2$ in FIG. 8, by applying the method according to the present invention, the carried traffic increases roughly by 3.3 $Erlang/km^2$, from 8.5 $Erlang/km^2$ to 11.8 $Erlang/km^2$. The relative carried traffic increase is roughly equal to 38.8%, and this can be considered as a dramatic improvement of system performance, as the exploitation of system resources increases almost by 40%.

Although the present invention has been disclosed and described by way of some embodiments, it is apparent to those skilled in the art that several modifications to the described embodiments, as well as other embodiments of the present invention are possible without departing from the scope thereof as defined in the appended claims.

In particular, it is pointed out that the method according to the present invention can be applied in general to any case in which a shared communication medium exists, and the communication medium is partitioned into a plurality of channels, irrespective of the nature of the communication medium and of the channels; thus, the invention applies in general to any type of MAC, either of the TDMA type, or of the CDMA, or FDMA type, or any combination of these types.

Other methods of computation of the vehicle position, speed, and ride direction may be exploited in substitution of the GPS-based method, particularly methods based on any other system, also not relying on satellites, and other types of communication channel partitioning and channel assignment can be envisaged.

The invention claimed is:
1. A method of controlling access by mobile users of a substantially infrastructureless communications network to a shared communication medium, wherein the shared communication medium is partitioned into a plurality of individual communication channels that can be individually exploited for communications between the network users, comprising:
    determining the existence of at least one main direction of movement of the network users, said main direction of movement being a direction around which directions of movement of a number of network users are clustered;

associating a group of communication channels within said plurality of communication channels to the at least one main direction of movement; and
reserving the communication channels of said group to the network users moving substantially in said main direction of movement,
wherein the determining the existence of at least one main direction of movement includes:
calculating a distribution of movement directions of at least neighboring network users of the network users that are clustered;
analyzing the distribution, wherein the analyzing includes determining peaks in the distribution;
calculating average velocity vectors for each main direction of movement by averaging the velocities of network users having direction of movement clustered around that direction of movement;
calculating relative average velocities between the average velocity vectors; and
validating each main direction of movement, provided that the relative average velocity thereof to the other average velocity vectors is not lower than a prescribed lower limit.

2. The method according to claim 1, comprising grouping the communication channels into a number of groups depending on a plurality of main directions of movement, and reserving different groups of channels to respective main directions of movement.

3. The method according to claim 2, wherein each channel group comprises a number of channels that depends on a number of network users having directions of movement clustered around the respective main direction of movement.

4. The method according to claim 1, comprising having each network user communicating to the other network users information concerning the respective direction of movement.

5. The method according to claim 4, wherein said information concerning the respective direction of movement comprises information on a network user's velocity vector.

6. The method according to claim 5, wherein said information on the network user's velocity vector is obtained by exploiting a geolocation detector or a GPS-based detector.

7. The method according to claim 1, wherein said analyzing the distribution further comprises determining the number of network users having direction of movement clustered around each peak, and validating a peak as a main direction of movement, provided that the respective number of network users exceeds a prescribed value.

8. The method according to claim 1, wherein said reserving the communication channels of said group to the network users moving substantially in said main direction of movement comprises assigning the channels of the group to the different network users substantially on a random basis.

9. The method according to claim 1, further comprising reserving a group of channels of said plurality of channels to network users not having a direction of movement clustered around the at least one main direction of movement.

10. A media access control (MAC) layer controlling access by a mobile user of a substantially infrastructureless communications network to a shared communication medium, wherein the media access control layer comprises a processor and the shared communication medium is partitioned into a plurality of individual communication channels that can be individually exploited for communications between the network users, the MAC layer granting access to the shared communication medium by:
determining the existence of at least one main direction of movement of the network users, said main direction of movement being a direction around which directions of movement of a prescribed number of network users are clustered;
associating a group of communication channels within said plurality of communication channels to the at least one main direction of movement; and
assigning to the network user one communication channel of said group in case the network user's direction of movement is clustered around the at least one main direction of movement,
wherein the determining the existence of at least one main direction of movement includes:
calculating a distribution of movement directions of at least neighboring network users of the network users that are clustered;
analyzing the distribution, wherein the analyzing includes determining peaks in the distribution;
calculating average velocity vectors for each main direction of movement by averaging the velocities of network users having direction of movement clustered around that direction of movement;
calculating relative average velocities between the average velocity vectors; and
validating each main direction of movement, provided that the relative average velocity thereof to the other average velocity vectors is not lower than a prescribed lower limit.

11. The medium access control layer according to claim 10, wherein the medium access control layer communicates to the medium access control layers of the other network users information concerning the direction of movement the network user.

12. The medium access control layer according to claim 11, wherein the medium access control layer includes information on a network user's velocity vector in at least one message transmitted by the network user.

13. The medium access control layer according to claim 12, wherein said information on the network user's velocity vector is derived from a geolocation detector or a GPS-based detector.

14. The medium access control layer according to claim 10, wherein the number of network users having direction of movement clustered around each peak is determined, and a peak is validated as a main direction of movement, provided that the respective number of network users exceeds a prescribed value.

15. The medium access control layer according to claim 10, wherein said one communication channel of the group is assigned to the network user substantially on a random basis.

16. The medium access control layer to claim 10, wherein the network user is assigned a communication channel not belonging to said group in case the network user's direction of movement is not clustered around the at least one main direction of movement.

17. A transmitter for a mobile user of a substantially infrastructureless communications network comprising a medium access control layer according to claim 10.

18. A substantially infrastructureless communications network with mobile network users acting as communication traffic routers, wherein the network users have transmitters according to claim 17.

* * * * *